United States Patent [19]

Larson et al.

[11] Patent Number: 4,497,800
[45] Date of Patent: Feb. 5, 1985

[54] STABLE LIQUID DIET COMPOSITION

[75] Inventors: Dalmon M. Larson; Jorge Reyes, both of Evansville, Ind.

[73] Assignee: Mead Johnson & Company, Evansville, Ind.

[21] Appl. No.: 395,515

[22] Filed: Jul. 6, 1982

[51] Int. Cl.$^3$ ..................... A61K 31/00; A61K 47/00; A23L 1/30; A23J 1/00
[52] U.S. Cl. ........................................ 514/2; 424/150; 424/157; 424/180; 424/195; 426/72; 426/74; 426/656; 426/658; 426/804
[58] Field of Search ............... 424/177, 180, 195, 150, 424/157; 426/72, 74, 656, 658, 804

[56] References Cited

U.S. PATENT DOCUMENTS

| | | | |
|---|---|---|---|
| 2,816,854 | 12/1957 | Gross | 424/177 |
| 3,256,095 | 7/1966 | Crosby et al. | 99/2 |
| 3,697,287 | 10/1972 | Winitz | 99/1 |
| 3,698,912 | 10/1972 | Winitz | 99/14 |
| 3,701,666 | 10/1972 | Winitz | 99/1 |
| 3,773,930 | 11/1973 | Mohammed et al. | 424/180 |
| 3,793,450 | 2/1974 | Schnell | 424/195 |
| 3,849,554 | 11/1974 | Winitz | 424/180 |
| 3,950,529 | 4/1976 | Fisher et al. | 424/273 |
| 4,025,650 | 5/1977 | Gans et al. | 424/177 |
| 4,042,687 | 8/1977 | Gans et al. | 424/177 |
| 4,042,688 | 8/1977 | Gans et al. | 424/177 |
| 4,298,601 | 11/1981 | Howard | 424/128 |
| 4,414,238 | 11/1983 | Schmidl | 424/74 |

FOREIGN PATENT DOCUMENTS 2922050  6/1979  Fed. Rep. of Germany .

OTHER PUBLICATIONS

The Merck Index, 9th ed., (1976)–item 1861, Merck & Co.
J. Agric. Food Chem., 29, 187-188, (1981)–Grundel et al.
Chem. Abst., 88, 188343(h), (1978)–Gur-Arieh et al.
Chem. Abst., 92, 162434(u),–Van Kranenburg.
Chem. Abst., 94, 63939(z), (1981)–Grundel et al.
Japanese J. Surgery, 11(5), 391-397, (1981)–Ogoshi et al.
Label copy–Vinonex and High Nitrogen Vivonex, 4/25.
J. Food Sci., 44, 1168-1171, (1976), (5/16)–LaMar et al.
Clinical Research, 29(5), 818A, (Dec. 1981)–Argeaga et al.
J. Parenteral Enteral. Nutr., 5(6), 559(1981)–J. Smith et al.
New England J. Med., 306(17), 1013-1018, (1982)–J. Smith et al.
Gastroenterology, 78, 393-410, (1980), Koretz et al.

*Primary Examiner*—Douglas W. Robinson
*Attorney, Agent, or Firm*—Richard P. Ryan; Robert H. Uloth

[57] ABSTRACT

A nutritionally complete ready-to-use liquid diet for providing total patient nourishment. This diet contains a source of protein equivalent comprised of free amino acids and small peptides; a carbohydrate source comprised of maltodextrin with a dextrose equivalent between 7 and 24 and a smaller amount of modified corn starch; a lipid component; nutritionally significant amounts of all essential vitamins and minerals; and stabilizers; all in an acidic aqueous emulsion which can be sterilized.

15 Claims, No Drawings

STABLE LIQUID DIET COMPOSITION

BACKGROUND OF THE INVENTION

Nutritionally complete liquid diet compositions have been increasingly employed over the past decade for nutritional support of undernourished patients or patients with gastrointestinal pathology. The term "elemental diet" as applied to these liquid diet compositions generally refers to an enterically administered liquid diet which provides the patient's basic nutritional requirements in an elemental, easily digestible source. The protein source in these diets is generally a protein hydrolysate or the individual amino acids in purified form or a mixture of these. Carbohydrates, the main caloric source ingredient in these diets, usually comprise sucrose and/or glucose or small polymers of glucose. The percentage of calories supplied as fat is usually limited, and in some diets the major portion of the administered fat is in the form of essential fatty acids. Vitamins, electrolytes and trace elements are also available in these elemental diets to meet nutritional requirements. These dietary compositions are typically marketed as dry blended or spray-dried powder that is reconstituted with water prior to consumption. The reconstituted liquid elemental diet is usually fed within two hours in most cases and generally should not be held for more than 24 hours, even when stored at refrigerated temperatures.

The general formulation and medical use of specialized liquid diets is not new. Crosby, et al, U.S. Pat. No. 3,256,095, granted June 14, 1966; disclosed a diet which could be administered either intravenously or orally for supplementation of patients with inadequate nutrition. The protein source for this particular diet was disclosed as being amides and/or acid salts of these amides of amino acids "indispensible" to the system of the mammal receiving the diet.

In U.S. Pat. No. 3,697,287, issued Oct. 10, 1972; Winitz disclosed a palatable aqueous emulsion (or dry aggregate, soluble in water) containing all essential amino acids, minerals, vitamins, carbohydrate, fat, and non-essential amino acids in balanced quantities to supply all nutritional needs for humans in such a form as to bypass normal digestive functions. For palatability, the maximum allowable levels of sulfur-containing amino acids and glutamate are specified. This diet formulation has the trade name Vivonex and is sold in commerce.

U.S. Pat. No. 3,698,912, granted Oct. 17, 1972 to Winitz covers the related process for treating a protein hydrolysate, involving removal of some components and addition of others, to give a palatable and nutritious balanced amino acid nutrient source which would be used as disclosed in accord with the '287 patent cited hereinabove.

In U.S. Pat. No. 3,701,666, also granted to Winitz on Oct. 31, 1972, a related process is disclosed for making palatable compositions composed entirely of purified individual amino acids, carbohydrates, fats, vitamins, and salts. This patent further specifies that the diet can be formulated as a solid, a concentrate, or as an immediate-use canned product following pasteurization of the liquid emulsion.

An additional patent to Winitz, U.S. Pat. No. 3,849,554, granted Nov. 19, 1974, discloses a method for lowering blood serum cholesterol by restricting subjects to a defined diet composition consisting essentially of vitamins, minerals, amino acids, essential fatty acids and a carbohydrate component selected from glucose, maltose and/or polysaccharides of glucose.

Of less relevance are the following patent disclosures. U.S. Pat. No. 3,773,930, issued Nov. 20, 1973 to K. Mohammed, et al, addresses improvement of flavor in low residue dietaries which are composed of amino acids, starches and/or sugars, minor amounts of fat, vitamins and minerals; by incorporating pectin and various fruit flavorings.

Snell in U.S. Pat. No. 3,793,450, issued Feb. 19, 1974 discloses stable dietary compositions for intravenous infusion, such compositions containing 1-10% of amino acids as free bases in a 1-15% fat emulsion, such as soya bean oil, this emulsion being stabilized with either soya or egg yolk phosphatides.

Fisher, et al., in U.S. Pat. No. 3,950,529, granted Apr. 13, 1976, discloses liquid diets formulated for intravenous or oral administration to patients with liver disease. These diets comprise a sterilized solution of amino acids in specified novel relative proportions, e.g. (isoleucine+leucine+valine) being 40-300 times tryptophane and approximately 15-135 times (phenylalanine or phenylalanine+tyrosine) for intravenous administration. For oral administration, this amino acid mixture is mixed with carbohydrates and/or fat, vitamins and minerals and reconstituted with water. This liquid diet is not subjected to sterilization but is made up prior to usage.

Although improvements in these compositions have evolved with the increasing widespread use of the diets in nutritional management of patients, some problems have persisted. While liquid diet compositions in immediate-use form have been previously disclosed (see the Winitz patents described hereinabove); no diet in this form has been made available on a commercial scale. This is in spite of the convenience offered by an elemental diet in a ready-to-use form. Considerable economies in hospital or institutional use could be realized as commissary space, equipment, and labor involved in reconstituting current powder diets on the part of hospital personnel would be eliminated as well as reducing chances of contamination. Heretofore, *commercialization* of a ready-to-use form has not been practical due to the inherent lack of stability in these diet formulations. Previous liquid diet compositions exhibit unacceptable levels of deterioration when subjected to the heat treatment required for effective sterilization, or even under the more ordinary conditions and ambient temperatures associated with shelf life studies. As an example, Vivonex-HN ® (Norwich Company, USA), the most popular of these elemental diets according to S. Ogoshi and H. Sato, *Japanese Journal of Surgery*, Vol. 11, No. 5, pages 391-397 (1981), states on its label that when mixed with water, Vivonex or High Nitrogen Vivonex may be left at room temperature for up to 8 hours or refrigerated for up to 24 hours. Previous label directions cautioned "In normal dilution, the solution is a perishable liquid food, and refrigeration is necessary. No more than the amount for a single day should be prepared at a time."

A major objective, therefore, of the present invention was to provide a liquid diet formulation in ready-to-use form which possessed adequate stability compared with previous diet formulations so that physical and nutritional quality would not be lost during sterilization and extended storage.

Aside from bacterial contamination there appear to be two other major underlying causes responsible for physical and nutritional deterioration of prior liquid diet compositions. One type of deterioration, primarily physical, can result from emulsion breakdown of the liquid composition which results in the oiling out of the lipid phase, or from precipitation of a solid, usually a mineral compound. Since elemental diets are frequently administered by enteral tube feeding via nasogastric tubing, physical stability of the liquid as a single phase is a critical prerequisite. P. L. LaMar, et al., *Journal of Food Science*, Vol. 44, pages 1168–1171 (1976) recognized the problem of emulsion breakdown in stability studies of liquid diets. The data indicated that diet emulsions made either from low heat-treated fish protein or from peptides derived from fish proteins, were more stable than those emulsions prepared with purified amino acids. High amylose starch also had a greater stabilizing effect on the emulsions than normal or waxy starch. Emcol AA-45 (a mixture of diacetyl tartaric acid esters of mono- and diglycerides manufactured by Witco Chemical Company, Los Angeles, Calif.) was used as an emulsifier in these studies. This work of LaMar et al relates to the present invention in that a similar mixture of diacetyl tartaric acid esters of mono- and diglycerides is also employed as one of the emulsifying agents in the instant diet.

A second type of deterioration besetting prior formulations of liquid elemental diets is due to the well known chemical reaction (i.e. browning) between amino acid moiety amine groups and carbohydrate carbonyl groups or their equivalent. For this reason ready-to-use liquid elemental diets have not been practical previously because they could not withstand the rigors of processing or maintain stability during the periods of storage required for such manufactured items. When the carbohydrate component and the protein source of such prior diets are put into solution, chemical reactions begin which result in the formation of condensation products which accumulate on standing, adversely affecting color, taste, and reducing the nutritional potential of the carbohydrate and protein ingredients. This process is further accelerated by increased temperature. An integral part of processing of any ready-to-use nutritionals is sterilization to eliminate spoilage caused by bacterial contamination. The instant diet composition is stable under sterilization conditions (above 212° F. for approximately 10 minutes) whereas the '554 Winitz patent cautioned against conditions other than those (either no more than 1 minute at 194° F. (90° C.) or no more than 5 minutes at 140° F. (60° C.)) consistent with mild pasteurization. The nature of the instant diet composition allowing sterilization and its processing will be disclosed more fully hereinafter.

A second objective of the present invention was to provide a ready-to-use liquid diet composition having a high nitrogen content with improved nutritional performance. A critical parameter for clinically assessing nutritional support is nitrogen balance. To improve nutritional performance in a diet composition, experimental work leading to the present invention has indicated the importance of the protein source being rich in branched amino acids, as well as selection of specific mineral salts found to be compatible with processing conditions. The subject diet composition also contains a significant amount of the protein equivalent in the form of small peptides.

Protein quality, somewhat difficult to assess, is a major determinant of nutritional performance in these diets. Measured in nutritional studies, retention of dietary nitrogen by a patient being fed a liquid diet is a key indicator of the diet's protein quality. A controlled trial comparing the composition of the instant invention with Vivonex-HN as reported by C. Arteaga, et al in *Clinical Research*, Vol. 29, No. 5, page 818A (December 1981) and by J. Smith, et al., in *J. Parenteral Enteral Nutr.*, Vol. 5, No. 6, page 559 (1981); and in *The New England Journal of Medicine*, Vol. 306, No. 17, pages 1013–1018 (1982); demonstrated that the instant diet composition was statistically significantly superior to Vivonex-HN in nitrogen utilization as measured by higher retention of absorbed nitrogen and lower azotemia.

In summary, the liquid diet composition of the present invention represents the first elemental diet which can be formulated and processed (i.e. sterilized) to yield a stable liquid, ready-to-use form which is equal or superior to reconstituted diet formulations with respect to physical stability and nutritional utilization.

SUMMARY OF THE INVENTION

This invention concerns a nutritionally complete liquid diet composition so formulated that it can be processed, including sterilization, to give a stabilized ready-to-use liquid product, useful in providing nourishment for patients with compromised digestive function and/or malabsorption. This high nitrogen liquid diet contains a source of protein equivalent comprising about 70% free amino acids and about 30% small peptides; a lipid component of safflower oil or a suitable equivalent; a carbohydrate source comprising maltodextrin with a dextrose equivalent between 7 and 24 and a smaller amount of modified corn starch; nutritionally significant amounts of all essential vitamins and minerals; and stabilizers; all in an acidic aqueous emulsion. Some important considerations contributing to the operability of the instant invention are: use of a protein equivalent source rich in branched amino acids, containing a significant amount of small peptides, and supplementation by the addition of purified methionine, tyrosine, and tryptophane; recognition of a preferred range in polymer size for the carbohydrate component; selection of mineral salts compatible with the required processing; utilization of effective stabilizers; and selection of an optimal pH range for processing.

DETAILED DESCRIPTION OF THE INVENTION

The instant invention is a liquid ready-to-use medical food comprising a high nitrogen nutritionally complete elemental diet containing protein, lipid, and carbohydrate components; as well as all the vitamins and minerals considered to be essential in daily diet. It is intended that this composition be used for enteral feeding, either orally or by intubation, for patients suffering from malnourishment and conditions associated therewith as well as for maintenance of patients with compromised digestive and/or absorptive function which can arise from a variety of causes. The methods and procedures for administration of medical foods are well known to those practitioners skilled in the pertinent art. It is to be understood that such feeding is generally done under direction of appropriately trained medical personnel.

The protein equivalent component of the subject elemental diet represents from 30–43 g per liter of diet of a hydrolyzed protein and a mixture of supplementing amino acids. As recognized in the art, the protein may be hydrolyzed chemically or enzymatically. The supplementing mixture of amino acids, which represents about 3% of the total protein equivalent component, is made up of purified L-methionine, L-tyrosine, and L-tryptophane. The finished diet composition contains a well utilized, hydrolyzed protein source which is two to three parts individual amino acids by weight per part small peptides, preferably about 70% free amino acids and 30% small peptides. The peptide mixture ranges from dipeptides with approximate molecular weights of 250 to decapeptides with approximate molecular weights of 1200. The average size in this peptide mixture would be at the tripepetide level. While the hydrolyzed protein can be derived from many protein sources, examples being casein, lactalbumin, soybean protein, etc.; preferentially a diet of this invention utilizes casein hydrolysate for approximately 97% of the protein equivalent. The choice of casein hydrolysate was based in part on supposition that patients with nutritional deficiencies may require a greater intake of branched amino acids for which casein is a good source. It should be understood by those skilled in the pertinent art that additional amino acids or their derivatives may be used to supplement these diet compositions. Such an example would be to incorporate taurine in the diet mixture.

The fatty component in the diet may be provided in various forms. Natural fat components such as, for example, safflower oil, soybean oil, corn oil, cotton seed oil, coconut oil, olive oil, and the like, may be used. Alternatively, fat may be provided in a chemically defined form, such as the essential fatty acids or their glycerol esters or alkyl esters. For the diet of this invention, it is preferred that from 1.5 to 10 g of safflower oil per liter of diet provides most of the fat content. Additional lipid may be present as soy oil and in the form of the fatty acid esters comprising the glyceride stabilizing agent.

The nature of the carbohydrate component, which comprises about 175 to 225 g per liter of diet, is one of the key aspects of the instant invention. Prior teachings regarding the carbohydrate source in elemental diets have not taught criticality but have indicated that a wide range of carbohydrate ingredients was suitable. The major carbohydrate source in the diet of the present invention comprises about 94% of soluble maltodextrin with a dextrose equivalent between 7 and 24 are preferably between 8 and 12. The remaining significant carbohydrate ingredient, representing about 6% of the total, is modified corn starch. Minor amounts of additional carbohydrate are supplied as organic acid anions, e.g. citrate, gluconate, glycerophosphate. The dextrose equivalent (DE) is an index relating to the carbohydrate's ability to function as a reducing sugar, for example, glucose, a simple sugar, has a DE of 100. A disaccharide of glucose has a DE of 50 and a tetrasaccharide of glucose would have a DE of 25. The specific DE range given above for the major carbohydrate component for this liquid diet composition is important for operability with respect to achieving the objectives of this invention under the conditions of sterilization and storage.

Nutritionally complete diets contain all vitamins and minerals understood to be essential in the daily diet and these should be present in nutritionally significant amounts. Those skilled in the art appreciate that minimum requirements have been established for certain vitamins and minerals that are known to be necessary for normal physiological function. Practitioners also understand that appropriate additional amounts (overages) of vitamin and mineral ingredients need to be provided to compensate for some loss during processing and storage of such diets. Two quarts (64 oz) of the instant diet composition provides in addition to 2000 calories, 100% of U.S. RDA's for all essential vitamins and minerals plus additional amounts of nitrogen, vitamins C, E and B complex, and zinc.

To select a specific mineral compound to be used in the diet requires consideration of that compound's chemical nature regarding compatibility with the processing and shelf storage. The ultimate choice of the mineral salts employed in this diet resulted from the experimental work done in its development. A high proportion of gluconate salts, while more expensive, represent the majority of mineral salts utilized due to their compatibilities in formulation and during processing of the diet of the present invention.

As discussed hereinabove, emulsion stability of these liquid foods is of major concern during the processing and subsequent shelf storage of these diets. While the use of stabilizing emulsifiers in liquid foods is well known, high stability of the finished liquid emulsion is imparted to the instant diet by incorporating from about 0.1 to 0.15 g per liter diet of emulsion stabilizer comprising carrageenan and/or Panodan TM. Panodan TM is a commercial mixture of diacetyl tartaric acid esters of mono- and diglycerides supplied by Grindsted Products, Inc., Industrial Airport, Kansas. In a preferred embodiment of the diet invention, both carrageenan and Panodan TM are utilized as stabilizers.

All the above-recited ingredients are taken to be the dispersed phase which is suspended in from about 800 to 850 g of water per liter of finished diet, and this resultant aqueous emulsion is treated with an edible organic or mineral acid in an amount sufficient to adjust the pH range to a value between about 4.0 and 5.7. This composition when processed and sterilized as described hereinbelow gives a commercially sterile elemental diet which is shelf stable for more than 12 months at room temperature.

The procedure for preparing the liquid ready-to-use diet of the instant invention is illustrated in the following example. This example, however, is not intended to limit the invention as other possible modifications in keeping with the invention disclosure and in the patent claims may be used. The following list of components and their amounts comprise the ingredients needed to prepare 10 liters of the instant diet.

| Ingredient | Amount |
| --- | --- |
| Protein: | |
| casein hydrolysate | 453.35 g |
| L-methionine | 5.42 g |
| L-tyrosine | 4.27 g |
| L-tryptophan | 1.79 g |
| Fat: | |
| safflower oil | 30.96 g |
| soy oil | 1.73 g |
| Carbohydrate: | |
| maltodextrin (DE range 8–12) | 2038.89 g |
| corn starch (modified) | 130.15 g |
| Vitamins: | |
| tocopheryl acetate (E) | 1.03 g |
| vitamin A palmitate | 4.72 mg |
| cholecalciferol (D$_3$) | 6.34 mg |

| Ingredient | Amount |
| --- | --- |
| phytonadione (K$_1$) | 3.44 mg |
| choline bitartrate | 6.07 g |
| thiamine hydrochloride (B$_1$) | 30.46 mg |
| riboflavin (B$_2$) | 27.50 mg |
| biotin trituration, 1% | 201.80 mg |
| niacinamide | 317.80 mg |
| calcium pantothenate | 181.03 mg |
| pyridoxine hydrochloride (B$_6$) | 39.59 mg |
| folic acid | 2.85 mg |
| vitamin B$_{12}$, 0.1% in gelatin | 103.40 mg |
| sodium ascorbate (C) | 4.69 g |
| Minerals: | |
| potassium citrate | 26.14 g |
| calcium gluconate | 24.04 g |
| calcium glycerophosphate | 18.40 g |
| magnesium chloride | 6.33 g |
| magnesium oxide | 1.84 g |
| copper gluconate | 82.08 mg |
| ferrous gluconate | 831.87 mg |
| zinc gluconate | 791.68 mg |
| manganese gluconate | 243.58 mg |
| potassium iodide | 1.16 mg |
| Stabilizers: | |
| diacetyl tartaric acid esters of mono-diglycerides | 1.98 g |
| carrageenan | 4.41 g |
| Acid: | 44.45 g |
| citric acid | |
| Aqueous Phase: H$_2$O | approx. 8200.00 g |

The following ingredients are uniformly dispersed in 4.1 kg of water: 2.04 kg maltodextrin solids, 453.35 g casein hydrolysate (approximately 82% protein equivalent content), 130.15 g modified corn starch solids, 6.07 g choline bitartrate, 24.04 g calcium gluconate, 18.40 g calcium glycerophosphate, 5.42 g L-methionine, 4.27 g L-tyrosine and 1.79 g L-tryptophan. This resulting liquid mixture is stirred and a solution of 25.2 g citric acid, 1.84 g magnesium oxide, 6.33 g magnesium chloride, 26.14 g potassium citrate, 82.04 mg copper gluconate, 831.87 mg ferrous gluconate, 791.68 mg zinc gluconate, and 243.58 mg manganese gluconate in 200 mL of water is added and stirred in thoroughly. The pH of this stirred liquid mixture is adjusted to approximately 4.40 with a 25-50% water solution of citric acid. Further dilution of this main aqueous mixture is then achieved by adding an additional 2.8 kg of water.

A fat solution is prepared in a separate vessel by stirring together, while heating to 145° F., 30.96 g of safflower oil and 1.98 g diacetyl tartaric acid esters of mono-diglycerides. To this heated fat solution is added 2.85 g of a preblend of fat soluble vitamins comprised of 1.73 g soy oil, 1.03 g dl-α-tocopheryl acetate, 47.15 mg vitamin A palmitate, 6.34 mg cholecalciferol, 3.44 mg phytonadione. Stirring is continued until the vitamin preblend is completely dissolved at which point 4.41 g carrageenan powder is added and stirred thoroughly to insure complete wetting of the powder with the oil phase.

The main aqueous liquid mixture is heated to 120° F. and stirred while the above-described fat solution (at 120°-145° F.) is slowly added. The resulting liquid mixture is then passed through a two-stage homogenizer with a valve setting of 2500 psig pressure in the first stage and 500 psig in the second stage. Following homogenization, the temperature is reduced to below 50° F. by the application of cooling. Sufficient water is then added at this point to adjust the solids content to about 25%. The exact amount of water to be added must be determined by analytic measurement but typically an amount of water totaling about 1.2 kg is required.

In 100 mL water the following vitamin and mineral ingredients are dissolved: 30.46 mg thiamine hydrochloride, 27.50 mg riboflavin, 201.80 mg biotin trituration (1%), 317.28 mg niacinamide, 181.03 mg calcium pantothenate, 39.59 mg pyridoxine hydrochloride, 2.85 mg folic acid, 103.40 mg vitamin B$_{12}$ (0.1% in gelatin), 4.69 g sodium ascorbate and 1.16 mg potassium iodide. This solution is then added to the main liquid mixture. The resulting non-sterile composition is filled into 8 oz glass bottles and commercially sterilized in a sterilizer (FMC Steritort Pilot Cooker) as follows. With the bottled product in place and the reel rotating at 8.5 rpm, the retort shelf temperature is raised in succession to 120° F. for 1½ minutes, to 150° F. for 1½ minutes, to 180° F. for 1½ minutes, to 208° F. for 1½ minutes, to 220° F. for 4.1 minutes and finally to the sterilization temperature of 272° F. for 6 minutes. The sterile product is then cooled to about 100° F. as rapidly as possible without causing package damage.

Alternatively, the non-sterile product may be sterilized by consecutive passage through two surface heat exchange votators. In the first votator the product temperature is raised to 200°-210° F. and in the second to 280° F. and held for 10 seconds. The product is then rapidly cooled to approximately 100° F. and aseptically filled into 8 oz metal cans and hermetically sealed.

Either sterilization method yields a commercially sterile elemental diet which has a shelf stability of more than 12 months at room temperature.

Achievement of nutritional stability following processing with sterilization for the subject liquid diet composition has been demonstrated both clinically (cf: citations on pages 5, 6 supra.) and by animal studies. Weanling rats fed the processed liquid diet composition exhibited near optimal growth performance in studies evaluating the effects of processing on protein quality of the composition.

It will be understood by those skilled in the art that variations and modifications made to this specific example in light of the descriptions given above may be employed without departing from the scope of the invention as defined in the following appended claims.

What is claimed is:

1. A liquid ready-to-use food composition comprising a high nitrogen nutritionally complete elemental diet containing
   (a) from 30 to 43 grams per liter diet of a protein equivalent component comprising about 97 parts by weight of a protein hydrolysate supplemented with about 1 part by weight each of L-methionine, L-tyrosine, and L-tryptophan;
   (b) from 1.5 to 10 grams per liter diet of a suitable lipid;
   (c) from 180 to 240 grams per liter diet of a carbohydrate component which is comprised of maltodextrin with a DE (dextrose equivalent) between 7 and 24 and modified corn starch with the maltodextrin comprising at least 85% of said carbohydrate component;
   (d) nutritionally significant amounts of essential vitamins and minerals;
   (e) from 0.1 to 1.5 gram per liter diet of an emulsion stabilizer comprising carrageenan and diacetyl tartaric acid esters of mono- and diglycerides;

(f) an edible organic or mineral acid in an amount sufficient to adjust the pH to a value between about 4.0 and 5.7; and (g) from 800 to 850 gram per liter diet of water wherein said diet is sterilized with retention of physical and nutritional stability.

2. The composition of claim 1 wherein the protein equivalent component comprises from 36 to 40 g of casein hydrolysate and from 0.2 to 0.6 g each of L-methionine, L-tyrosine, and L-tryptophan per liter of diet.

3. The composition of claim 1 wherein the lipid component is comprised of safflower oil in the amount of 2 to 4 g per liter diet.

4. The composition of claim 1 wherein the carbohydrate component includes the following in the stated amounts, ± about 5%, per liter: maltodextrin with a DE from 8 to 12, 200 g; modified corn starch, 13 g.

5. The composition of claim 1 containing the following vitamins in quantities sufficient to provide the stated minimum amounts per liter: vitamin A, 2640 IU; vitamin D, 210 IU; vitamin E, 40 IU; vitamin C (ascorbic acid), 160 mg; folic acid, 210 mcg; thiamine (vitamin $B_1$), 2.0 mg; riboflavin (vitamin $B_2$), 2.0 mg; niacin, 26 mg; vitamin $B_6$, 2.6 mg; vitamin $B_{12}$, 7.9 mcg; biotin, 142 mcg; pantothenic acid, 13 mg; vitamin K, 130 mcg; choline, 260 mg; and inositol, 60 mg.

6. A composition in accordance with claim 5 wherein said vitamins are supplied from the following in the stated amounts, ± about 5%, per liter: vitamin A palmitate, 4.72 mg; cholecalciferol, 634 mcg; tocopheryl acetate, 103 mg; sodium ascorbate, 469 mg; folic acid, 285 mcg; thiamine hydrochloride, 3.05 mg; riboflavin, 2.75 mg; niacinamide, 31.78 mg; pyridoxine hydrochloride, 3.96 mg; vitamin $B_{12}$, 0.1% in gelatin, 10.34 mg; biotin trituration, 1%, 20.18 mg; calcium pantothenate, 18.10 mg; phytonadione, 344 mcg; choline bitartrate, 607 mg.

7. The composition of claim 1 containing the following minerals in quantities sufficient to provide the stated minimum amounts per liter: calcium, 530 mg; phosphorus, 530 mg; iodine, 79 mcg; iron, 9.5 mg; magnesium, 210 mg; copper, 1 mg; zinc, 10 mg; manganese, 2.6 mg; chloride, 1060 mg; potassium, 1320 mg; and sodium, 630 mg.

8. A composition in accordance with claim 7 wherein said minerals are supplied by the following in the stated amounts, ± about 5%, per liter: potassium citrate, 2.61 g; calcium gluconate, 2.4 g; calcium glycerophosphate, 1.84 g; magnesium chloride, 0.63 g; magnesium oxide, 0.18 g; copper gluconate, 8.21 mg; ferrous gluconate, 83.19 mg; zinc gluconate, 79.17 mg; manganese gluconate, 24.36 mg; and potassium iodide, 116 mcg.

9. The composition of claim 1 wherein the emulsion stabilizer is comprised of the following in the stated amounts, ± about 5%, per liter: Panodan brand of diacetyl tartaric acid esters of mono- and diglycerides, 0.2 g; and carrageenan, 0.44 g.

10. The composition of claim 1 wherein citric acid is used to adjust the pH to a value between about 4.0 and 5.7.

11. The composition of claim 10 wherein the pH is adjusted to 4.5 or below.

12. A liquid ready-to-use food composition comprising a high nitrogen nutritionally complete elemental diet containing the following components in the stated amounts, ± about 5% per liter:

(a) casein hydrolysate, 45.3 g; L-methionine, 0.5 g; L-tyrosine, 0.4 g; and L-tryptophane, 0.2 g;

(b) safflower oil, 3.1 g and soy oil, 0.2 g;

(c) maltodextrin solids (10 DE), 204 g; and modified corn starch solids, 13 g;

(d) vitamin A palmitate, 4.72 mg; cholecalciferol, 634 mcg; tocopheryl acetate, 103 mg; sodium ascorbate, 469 mg; folic acid, 285 mcg; thiamine hydrochloride, 3.05 mg; riboflavin, 2.75 mg; niacinamide, 31.78 mg; pyridoxine hydrochloride, 3.96 mg; vitamin $B_{12}$, 0.1% in gelatin, 10.34 mg; biotin trituration, 1%, 20.18 mg; calcium pantothenate, 18.10 mg; phytonadione, 344 mcg; choline bitartrate, 607 mg;

(e) potassium citrate, 2.61 g; calcium gluconate, 2.4 g; calcium glycerophosphate, 1.84 g; magnesium chloride, 0.63 g; magnesium oxide, 0.18 g; copper gluconate, 8.21 mg; ferrous gluconate, 83.19 mg; zinc gluconate, 79.17 mg; manganese gluconate, 24.36 mg; and potassium iodide, 116 mcg;

(f) Panodan brand of diacetyl tartaric acid esters of mono-diglycerides, 0.2 g; and carrageenan, 0.44 g;

(g) citric acid in an amount sufficient to adjust the pH to a value to 4.5 or below; and (h) water, 830 g;

wherein said diet is sterilized with retention of physical and nutritional stability.

13. The method of providing nourishment for a human patient in need of such nourishment which comprises administering to said patient a nutritionally effective amount of the liquid diet formulation defined in claim 1.

14. The method of providing nourishment for a human patient in need of such nourishment which comprises administering to said patient a nutritionally effective amount of the liquid diet formulation defined in claim 12.

15. The composition of claim 1 wherein the protein hydrolysate is comprised of a mixture of about 2 to 3 parts by weight of individual amino acids and about 1 part by weight of small peptides ranging in size from dipeptides, with approximate molecular weights of 250, to decapeptides, with approximate molecular weights of 1200.

* * * * *